(12) United States Patent
Meckler

(10) Patent No.: US 6,651,443 B1
(45) Date of Patent: Nov. 25, 2003

(54) INTEGRATED ABSORPTION COGENERATION

(76) Inventor: Milton Meckler, 1930 S. Beverly Glen Blvd., PH3, Los Angeles, CA (US) 90025

( * ) Notice: Subject to any disclaimer, the term of this patent is extended or adjusted under 35 U.S.C. 154(b) by 17 days.

(21) Appl. No.: 09/974,368

(22) Filed: Oct. 10, 2001

Related U.S. Application Data

(60) Provisional application No. 60/242,153, filed on Oct. 20, 2000.

(51) Int. Cl.$^7$ ................................................. F02C 6/18
(52) U.S. Cl. ......................... 60/783; 60/39.182; 60/728
(58) Field of Search ..................... 60/39.181, 39.182, 60/783, 39.19, 728

(56) References Cited

U.S. PATENT DOCUMENTS

| | | | | |
|---|---|---|---|---|
| 3,788,066 A | * | 1/1974 | Nebgen ........................ | 60/775 |
| 3,796,045 A | * | 3/1974 | Foster-Pegg ................. | 60/772 |
| 3,877,218 A | * | 4/1975 | Nebgen ........................ | 60/775 |
| 3,882,671 A | * | 5/1975 | Nebgen ........................ | 60/781 |
| 3,895,243 A | * | 7/1975 | Amend et al. ................ | 310/11 |
| 3,971,211 A | | 7/1976 | Wethe et al. | |
| 3,974,642 A | | 8/1976 | Pacault | |
| 4,184,325 A | * | 1/1980 | Mandrin ................... | 60/39.181 |
| 4,199,961 A | | 4/1980 | Carter et al. | |
| 4,290,273 A | | 9/1981 | Meckler | |
| 4,328,677 A | | 5/1982 | Meckler | |
| 4,594,850 A | | 6/1986 | Joy | |
| 4,720,968 A | | 1/1988 | Knizia | |
| 4,815,527 A | | 3/1989 | Meckler | |
| 4,907,405 A | | 3/1990 | Polizzotto | |
| 5,101,772 A | | 4/1992 | Bruhn | |
| 5,565,716 A | | 10/1996 | Tierney, Jr. | |
| 5,600,967 A | | 2/1997 | Meckler | |
| 5,632,148 A | | 5/1997 | Bronicki et al. | |
| 5,799,626 A | | 9/1998 | Ponsford et al. | |
| 5,816,070 A | | 10/1998 | Meckler | |
| 5,930,990 A | * | 8/1999 | Zachary et al. ............ | 60/39.53 |
| 6,050,083 A | | 4/2000 | Meckler | |

OTHER PUBLICATIONS

Cool Prescription which appeared in Consulting Specifying Engineer Apr., 1997.
Cool Prescription Revisited, published in Consulting Specifying Engineer, Feb., 2000.
"The Influences Of The Compression Interstate Cooling by Adiabatic Humidification, Of The Steam Injection And Of The Oxygen Enriched Combustion Upon The Gas Turbine Co–Generation Systems" by Dumitrascu, Marin, Charon, and Horbaniug, preprint, vol. 2, Sep. 6, 2001, of the Second International Heat Powered Cycles Conference at the Conservatoire National des Arts et Metiers, Paris, France, dated Sep. 5–7, 2001.

* cited by examiner

*Primary Examiner*—Ehud Gartenberg
(74) *Attorney, Agent, or Firm*—Kramer Levin Naftalis and Frankel LLP; Gregor N. Neff, Esq.

(57) ABSTRACT

The heated exhaust gases of a fueled turbine are used to heat a high-temperature-resistant heat transfer liquid, which is used first to generate steam, and then as a heat source for an absorption chiller, and then to heat hot water, thereby maximizing heat transfer from the exhaust gases. Steam is used to drive a steam turbine, and another absorption chiller is connected selectively to use the exhaust steam from the turbine as a heat source to produce refrigeration. Chilled water from the chiller(s) can be used for space cooling in buildings, and/or to cool the fueled turbine inlet air in hot weather.

26 Claims, 3 Drawing Sheets

INTEGRATED ABSORPTION COGENERATION

This patent application claims priority from Provisional patent application Serial No. 60/242,153 filed Oct. 20, 2000, the disclosure of which hereby is incorporated by reference.

This invention relates to cogeneration, and particularly to systems and methods for generating electricity together with refrigeration and/or heat.

Cogeneration systems offer the opportunity to reduce the cost of electrical energy for a building complex, factory, hospital, or local group, and to ensure the continuous availability of electrical energy during blackouts or "brownouts", while simultaneously providing cooling and/ or heating.

One can further improve the energy efficiency of cogeneration systems where power, heating and thermally actuated refrigeration result from the improved utilization of a single fuel source by independently controlling the simultaneous amount of each in accordance with time-varying use needs. This is a variety of "cogeneration" sometimes referred to as "trigeneration", to which this invention also pertains.

Many cogeneration systems and methods have been proposed in the past. Many include turbines using liquid or gaseous hydrocarbon fuels to produce electricity. Although it always is desirable to make maximum use of the fuel which is burned, it becomes even more important when the price of such fuels increases to unprecedented heights in response to artificial or naturally-caused shortages and ever-increasing demand.

Accordingly, it is an object of the present invention to provide a cogeneration system and method having improved efficiency in the usage of fuel, with maximized output of electrical energy as well as cooling and/or heating.

It also is an object of the invention to provide a cogeneration system which is relatively compact and has a relatively low initial cost.

It is a further object of the invention to provide a cogeneration system and method which are versatile in producing variable quantities of electrical power, refrigeration and heat, in accordance with varying demand.

A highly desirable cogeneration system and method are disclosed in my U.S. Pat. No. 6,050,083, and in an article entitled Cool Prescription which appeared in *Consulting Specifying Engineer* April, 1997. Despite the advantages of that system and method, further improvements are highly desirable, and it is an object of this invention to provide them. Certain aspects of the present system and method are set forth in the article entitled Cool Prescription, Revisited, published in *Consulting Specifying Engineer*, February, 2000, and the disclosure of both articles hereby is incorporated by reference.

In accordance with the present invention, the foregoing objects are met by the provision of a cogeneration system and method in which a fueled turbine is used to generate electricity and/or refrigeration, and its hot exhaust gases are used to operate one or more absorption chillers.

The hot exhaust gases preferably are used to heat a high-temperature-resistant heat transfer liquid which is connected to deliver heat to one or more absorption chillers, and to generate steam. Preferably, the heat transfer liquid flows in a closed circuit path and the absorber generator is located in the return portion of that path. The steam is used to drive a steam turbine which also generates electricity or drives mechanical refrigeration equipment.

Advantageously, in one embodiment of the invention, an absorption chiller is connected to use exhaust steam from the steam turbine as a heat source, thus increasing the refrigeration produced from the hot exhaust gases of the turbine.

In accordance with another feature of the invention, relatively low-pressure steam is extracted from the steam turbine and injected into the fueled turbine to further improve the efficiency of the fueled turbine. Advantageously, some of the steam extracted for use in deaeration of the water used in the system is the steam used for injection into the fueled turbine.

The cogeneration system and method of the present invention has numerous advantages. The invention uses energy from the fueled turbine exhaust which otherwise might be wasted. Furthermore, the fueled turbine or both turbines can be used to generate more electricity than if they also were required to drive mechanical refrigeration.

In addition, mechanical clutches to couple the turbines to the mechanical refrigeration machines are not needed because many absorption chillers do not need mechanical compression.

The use of a high-temperature resistant heat transfer liquid in the heat exchanger of the steam generator significantly reduces the size and the cost of the steam generator, and reduces its operating and maintenance costs.

In one embodiment of the invention, a second steam turbine is driven off the exhaust steam from the first steam turbine, and the shaft power of the second turbine is used to drive hybrid absorption chillers in which some mechanical compression is used.

A significant advantage of placing the generator of the absorption chiller in the heat transfer fluid return line is that this improves the efficiency of the heat exchanger in extracting heat from the fueled turbine exhaust by increasing the temperature drop across the heat exchanger, thus reducing the cost of the heat exchanger needed and improving heat recovery from the fueled turbine exhaust.

Advantageously, the temperature drop can be further increased by using the heat transfer liquid to heat hot water for use in space or process heating, and, if needed, lower-temperature hot water for distribution in a building.

An auxiliary heater can be used to heat the heat transfer liquid when the turbine exhaust is not sufficient.

Chilled water from the absorption chiller(s) can be used for space cooling, and/or to cool the inlet air temperature for the fueled turbine, and/or generate ice for storage in an ice bank.

Control of the absorptive chiller output can be obtained by use of temperature sensing and control of a bypass valve. Similar control is provided for the generation of steam and direction of the hot exhaust gases from the fueled turbine.

The foregoing and other objects and advantages of the invention will be set forth in or apparent from the following description and drawings.

GENERAL DESCRIPTION

Figure 1:
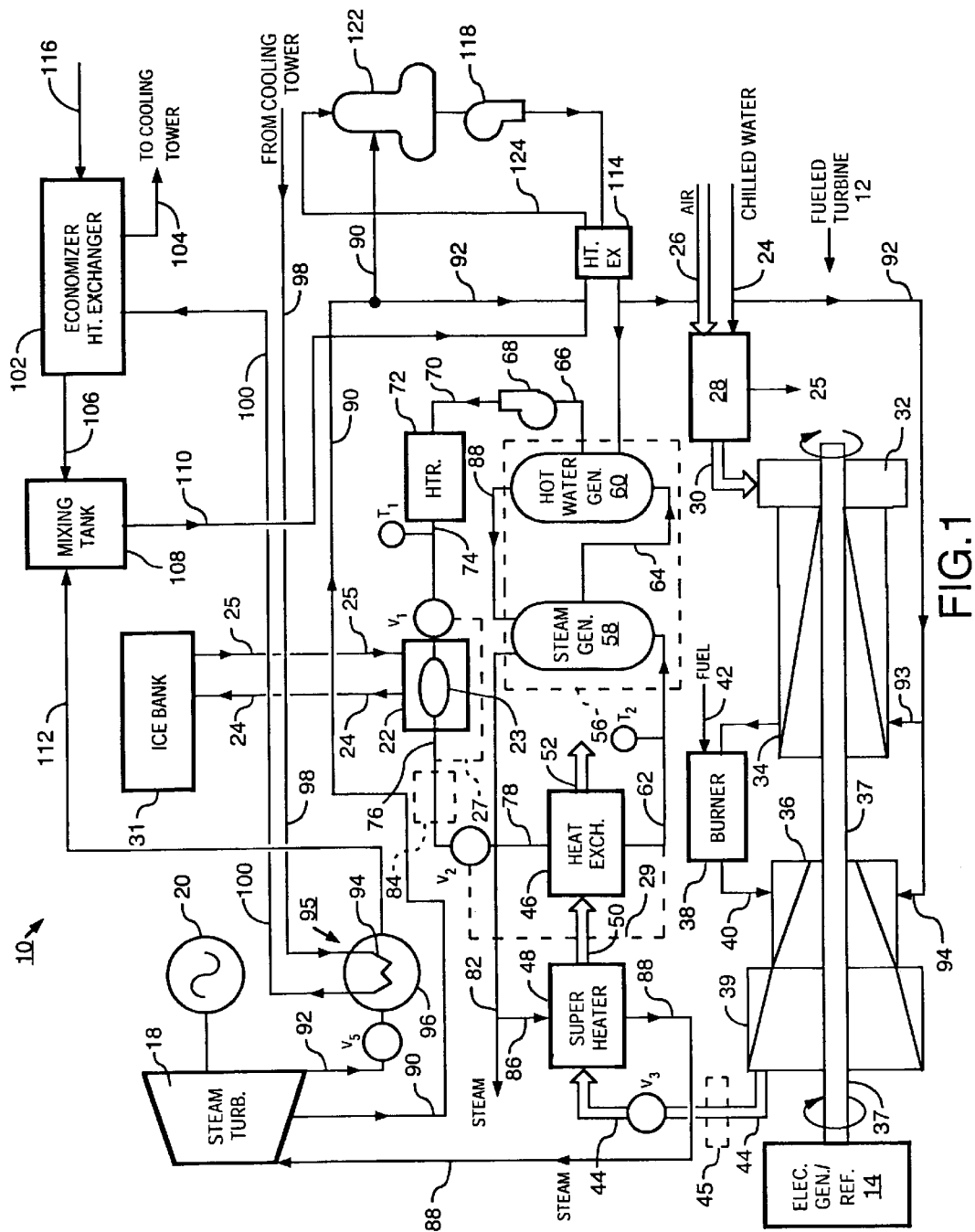
FIG. 1 is a schematic diagram of a cogeneration system constructed in accordance with the present invention.

FIG. 1 is a schematic diagram illustrating a cogeneration system 10 constructed in accordance with the present invention.

The system includes a fueled turbine 12 with an output drive shaft 37 which drives a first working machine 14. The machine 14 preferably is an electric generator. Alternatively, it can be a mechanical refrigeration unit. If the primary output desired is electricity, then the present invention allows the unit 14 to be used exclusively for electric power generation, while still providing refrigeration.

The heated exhaust 44 from the turbine is utilized to generate steam which drives a steam turbine 18. The steam turbine drives a second working machine 20 which can be an electrical generator or a mechanical refrigeration unit. Again, if electricity is the most needed output, the steam turbine can be used primarily to produce electric power, while still providing refrigeration.

In accordance with the present invention, the hot exhaust gases 44 also are used not only to generate steam, but also to supply heat to an absorption chiller 22 to produce refrigeration. Optionally, another absorption chiller 95 can be operated utilizing the exhaust steam from the turbine 18 as a heat source. The second absorption chiller can be used in addition to or instead of the chiller 22.

HEAT RECOVERY SYSTEM

The hot turbine exhaust 44 is directed through a diverter V3 to a superheater 48. The hot gases 50 output from the superheater 48 are directed to a heat exchanger 46. The exhaust gases 52 exiting the heat exchanger 46 then are discharged to ambient.

The heat exchanger 46 contains a high-temperature-resistant heat transfer liquid, such as "Dowtherm", "Paratherm", oil or other known organic heat transfer liquids which resist deterioration when held at temperature in the range of 500° F. to 700° F., say 600° F.

The heat transfer liquid is caused to flow through a closed circuit path, indicated in FIG. 1 by heavy lines, and consisting of conduits 62, 64, 66, 70, 74, 76 and 78. A pump 68 is provided to move the liquid through the path. The heat transfer liquid leaving the heat exchanger through conduit section 62 is delivered to a steam and hot water generating unit indicated by dashed lines 56.

The first unit in the steam and hot water generator 56 is a steam generator 58 which generates steam delivered over output line 82. Some of the steam is delivered through a line 86 to the superheater 48 where it is superheated by the hot exhaust gases and delivered through an output line 88 to the steam turbine 18. Additional steam is made available for general use, such as in heating a building, supplying heat or steam for use in chemical processing, etc.

The somewhat cooled heat transfer liquid is sent through conduit segment 64 to a hot water generator 60. The hot water generator heats relatively cool water supplied by a pump 118 and sends it through an output line 80 to the steam generator, which turns the heated water into steam.

Advantageously, the steam and hot water generator 56 preferably is a hybrid unit made by the Paul Mueller Company, Springfield, Mo., U.S.A. That unit uses heat exchangers which are a hybrid between shell-and-tube and plate-type heat exchangers and combines the heat exchangers for the steam and hot water generators in the same structure, thus providing a relatively compact and inexpensive system.

AUXILIARY HEATER

The heat transfer liquid exits the hot water generator 60 through conduit section 66, the pump 68 and the conduit section 70, and flows to an auxiliary heater 72, which is used selectively to heat the liquid in the conduit, if and when needed.

FLOW REGULATION

The heat transfer liquid exits the heater 72 through conduit section 74 and flows through a diverter valve V1 to the generator section 23 of the absorption chiller 22. Valve V1 meters the flow of heat transfer fluid to the generator section 23 by diverting anywhere from 0% to 100% of the flow through a bypass line 27, in order to regulate the heat input to the chiller in response to changing cooling demand.

The heat transfer liquid exits the absorption chiller 22 through conduit section 76, passes through one or more optional additional heat-utilization devices 84. Examples of the devices 84 will be described below.

A diverter valve V2 is controlled to divert the flow of heat transfer liquid through a bypass 29 in an amount varying from 0% to 100%, in order to control the temperature T2 of the heat transfer liquid entering the steam generator to control the generation of steam in response to varying demand.

It should be understood that the amount of steam generated and heat utilized from the turbine exhaust also can be controlled by used of the diverter V3, which can be used to divert anywhere from 0% to 100% of the turbine exhaust out of the flow path indicated by the arrows 44, 50 and 52.

The temperature of the heat transfer liquid is measured at least at two points, T1 and T2. The temperature T1 is the temperature in the conduit segment 74 just downstream from the heater 72. T2 is the temperature of the liquid at the output of the heat exchanger in the conduit section 62.

Ordinarily, when steam demand is highest, all of the heat transfer liquid flows through the heat exchanger 46, and the temperature T2 of the heat transfer liquid leaving the heat exchanger 46 is relatively high; of the order of 600° F. or even higher.

Under those circumstances, the temperature T1 of the liquid leaving the heater 72 normally is around 400° F., the heater 72 is not operating, and the temperature of the heat transfer liquid exiting the chiller 22 is around 325° F.

Thus, in accordance with one aspect of the present invention, the absorption chiller is located in the heat transfer liquid conduit downstream from the steam generator so as to further reduce the temperature of the liquid before it returns to the heat exchanger 46. This has the significant advantage of increasing the temperature drop across the heat exchanger 46, thus significantly increasing the amount of heat extracted from the turbine exhaust gases for doing useful work.

STEAM TURBINE OPERATION

Super-heated steam at around 600° F. is delivered through the line 88 to the steam turbine 18, which can be either of the condensing type, or the back-pressure type. The condensing type turbine gives more shaft power than the back-pressure type because the condensing turbine operates at a lower exhaust pressure. The condensing type turbine can be used to supply steam at 130 p.s.i.g. via an extraction port to a two-stage absorption chiller. The back-pressure turbine can be used to supply 15 p.s.i.g. steam to operate a single-stage absorption chiller which is used as a bottoming cycle, thereby eliminating the need for a separate condenser.

MULTI-STAGE REFRIGERATION OPTION

When the turbine 18 is a condensing turbine, the absorption chiller 95 preferably is a two-stage chiller in which the circle 96 represents the highest-stage generator. Exhaust steam at around 130 p.s.i.g. exits through a line 92 to the generator 96. The chiller has a condenser 94 using water from a cooling tower delivered through a line 98 to cool the condenser and the absorber. Cooling water is returned through a line 100 to the economizer heat exchanger 102 which heats the water and returns it through an output line 106 to a mixing tank 108. Steam condensate also is delivered through a line 112 to the tank 108.

Heated makeup water is delivered through the line 110 to a heat exchanger 114 which extracts heat from the water and sends it through a line 124 to a deaeration unit 122 which delivers deaerated water through a pump 118 to the heat exchanger 114 which then sends the heated water to the hot water generator 60.

Deaeration steam at about 5 p.s.i.g. is delivered through a line 90 from the steam turbine to the deaerator 122 to be used in a known manner in the deaeration process.

The two-stage absorption chiller, of course, produces refrigeration more efficiently than a single-stage chiller.

SINGLE-STAGE REFRIGERATION OPTION

In this option, the turbine 18 is a back-pressure type which produces exhaust steam at only about 15 p.s.i.g. The temperature of this steam usually is not high enough to supply a multi-stage chiller. Therefore, preferably the chiller 95 is a single-stage unit. In this case, the circle 96 represents the generator section of the single-stage chiller, and the 15 p.s.i.g. steam delivered through line 92 is used to heat it. The cooling tower water entering condenser 94 from line 98 and discharging to line 100 is used to absorb the excess heat from the condenser and absorber of the absorption chiller. Advantageously, the condenser 94 can be used as well as to condense the remaining steam received from the turbine 18.

Although the condensing turbine and two-stage absorptive chiller produce the highest levels of both shaft power and refrigeration, the back-pressure turbine and single-stage chiller offers equipment cost savings.

The steam pressures of 130 p.s.i.g. and 15 p.s.i.g. referred to above apply to a lithium-bromide-water refrigerant system. Other steam pressures would apply to other refrigerants. Lower temperature condensate from the condensing turbine or other waste heat source can be used with DEMTEG and R125 refrigerant.

CONVERTIBLE SYSTEM

If desired, either of the two systems described above can be made convertible. A modulating control valve V5 is provided to send the turbine exhaust steam either to a separate condenser (not shown) or directly to the condenser 94. Thus, when the refrigeration demand is low but electrical demand is high, valve V5 is operated to reduce or stop the flow of steam to the absorption chiller generator, and the steam is used to develop maximum shaft power, with less or no refrigeration. Then, when refrigeration demand is high, the valve V5 is reversed and the absorption chiller is switched into operation to provide additional refrigeration, without the use of clutches or other such mechanisms required by mechanical refrigeration equipment.

FUELED TURBINE

The fueled turbine 12 is a simple, single-stage turbine that is shown as an example of the many different types of turbines which can be used in accordance with the present invention.

The turbine 12 utilizes gaseous or liquid hydrocarbon fuels supplied through a line 42 to a burner 38.

Air is taken in as indicated at 30 into a manifold 32.

In accordance with one feature of the present invention, atmospheric air first flows through a heat exchanger 28 which uses chilled water supplied over a line 24 from the absorption chiller 22 (or the chiller 95, if it is available) to cool the input air delivered at 30 into the turbine. Return water is supplied over a line 25 which returns the water to the absorption chiller 22 and/or 95.

This greatly increases the efficiency of the turbine 12 during hot weather because turbine efficiency decreases significantly with increasing air temperature.

It should be noted that evaporative cooling also can be used, either in addition to, or instead of refrigeration, to cool the inlet air to the turbine. A water spray or fog can be used, with injection either at the air inlet or directly into the compressor of the turbine, as it is well-known. The use of evaporative cooling of the inlet air allows use of more of the chilled water produced by the absorption chiller(s) for other cooling jobs, such as air conditioning enclosed building spaces, making ice for storage in an ice bank 31, etc.

The intake air is compressed by a compressor section 34 of the turbine 12, and the compressed air is delivered to the burner 38, which then heats the compressed air and delivers it through a path 40 to the turbine and diffuser sections 36 and 39 of the turbine. The hot gas delivered to the turbine 36 rotates the shaft 37 to produce output shaft power.

STEAM INJECTION

In accordance with another feature of the present invention, relatively low-pressure steam, at 5 p.s.i.g., for example, is delivered through a line 92 from the deaeration steam line 90 to one or two locations indicated at 93 and 94, near the inlet to and/or outlet from the burner 38. This steam injection is believed to improve the power output of the turbine, as it is explained in the article entitled "*The Influences Of The Compression Interstate Cooling By Adiabatic Humidification, Of The Steam Injection And Of The Oxygen Enriched Combustion Upon The Gas Turbine Co-Generation Systems*" by Dumitrascu, Marin, Charon, and Horbaniuc, preprint, Volume 2, Sep. 6, 2001, of the Second International Heat Powered Cycles Conference at the Conservatoire National des Arts et Metiers, Paris, France, dated Sep. 5–7, 2001.

It is believed that steam injection also may extend the useful life of turbine components by reducing gas temperatures in the turbine.

The turbine 12 can be any of a number of different types of turbines, such as aero-derivative turbines which typically are used in smaller systems and have a variable output speed, and industrial turbines which are designed to run continuously at a constant speed. Turbines using regeneration, intercooling, and/or reheating between multiple-turbine stages; turbines with multiple shafts, multiple-compression stages, etc. also can be used, depending upon the size and budget for the system, etc.

SINGLE-STAGE ABSORPTIVE CHILLER

Figure 2:
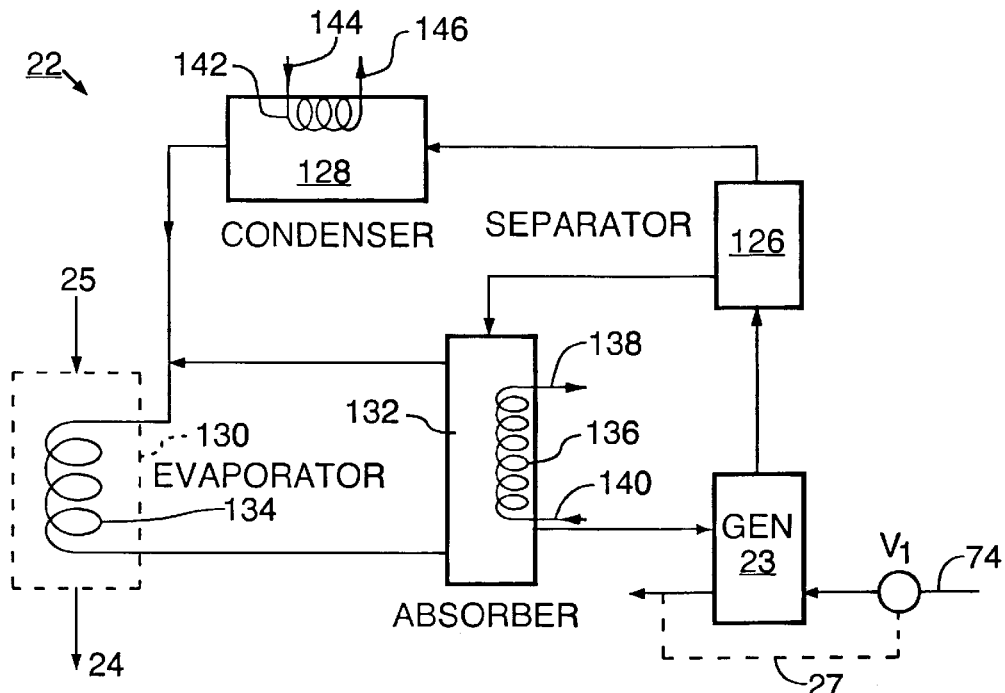
FIG. 2 is a schematic diagram illustrating one embodiment of an absorptive chiller used in the system of FIG. 1.

FIG. 2 is a schematic diagram of a typical single-stage, indirectly-fired ammonia-water absorption chiller, which is merely one example of a variety of absorption chillers which can be used with the present invention.

The chiller 22 includes a refrigerant vapor generator section 23.

The high-temperature heat transfer liquid flows through the heat exchanger (not shown) of the generator section 23 to drive off ammonia refrigerant vapor which is delivered to a separator section 126 which separates water from the vapor and sends the vapor to a condenser 128. The condenser 128 liquefies the refrigerant vapor and sends the liquid to an evaporator 130 which absorbs heat through a coil 134 from water flowing into the chamber of the evaporator at 25 and out at 24, thus producing chilled water.

The liquid refrigerant changes state to a vapor and is delivered to an absorber 132, which also receives water from the separator 126.

Finally, refrigerant-laden water is sent from the absorber to the generator 23 to complete the refrigeration cycle. Cooling water is delivered to cooling coils 136 and 142 for the absorber and condenser, respectively, to dissipate the heat generated in those sections. Cooling water is delivered through lines 140 and 144 and exits through lines 138 and 146, respectively. The cooling water typically is obtained from a cooling tower (not shown).

It should be understood that a variety of different absorptive cooling systems can be used. In this case, the chiller is a single-stage machine. However, given the relatively high temperature of the heat source (the heat transfer liquid), a multiple-stage absorption chiller is preferred for use in the closed circuit.

The refrigerant-absorber combination can be any of a variety of known combination, such as ammonia-water; lithium bromide-water; dimethyl ether tetraethylene glycol ("DEMTEG") absorbent with pentaflouroethane (R125) refrigerant, or any other of a variety of known refrigerant-absorbent combinations. The DEMTEG-R125 combination is particularly well adapted to use relatively low-temperature (e.g., around 212° F.) heat sources.

MULTI-STAGE ABSORPTION CHILLER

Figure 3:
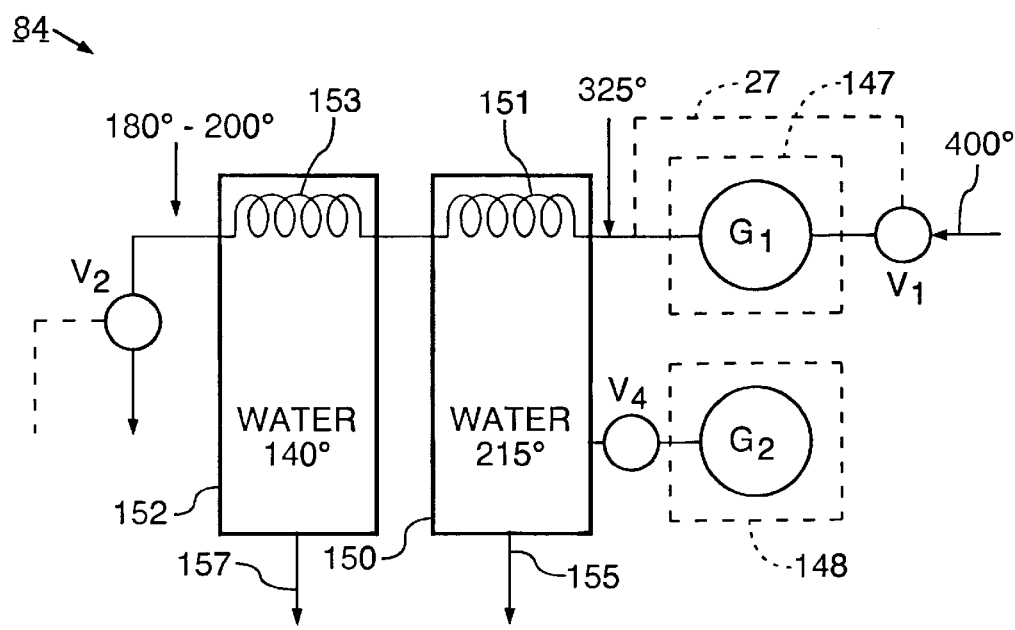
FIG. 3 is another embodiment of an absorptive chiller and water heaters used in the system of FIG. 1.

FIG. 3 is a schematic diagram of a two-stage absorption chiller 147 and a single-stage absorption chiller 148, showing one way in which such chillers can be operated effectively using the high-temperature-resistant heat transfer fluid as a heat source.

The chiller 147 has a top-level (highest temperature) generator section G1. The single-stage absorption chiller 148 has a generator section G2.

After the heat transfer-liquid passes through the generator section G1 of chiller 147, it passes through heat utilization equipment 84 which includes the heating coil 151 of a hot water heater and storage tank 150. The tank 150 stores water at a relatively high temperature, such as 215° F., for use in a heating system to heat buildings, or for other heating uses, as well as to supply heat to the generator section G2 of chiller 148.

The heat transfer liquid then passes to a second heating coil 153 of a second hot water heater 152 which generates hot water at around 140° F. for use as hot water for human use in bathing, washing clothes, and other such functions. At the outlet of the heating coil 153, the temperature of the heat transfer liquid has been reduced to a range of 180° to 200°, substantially lower than both the 400° F. and 325° F. temperatures at the inlet and outlet of the first stage of the chiller 147.

The temperature required for heat to the single-stage chiller 148 can be lower than that required for the two-stage chiller 147. For example, using a DEMTEG-R125 refrigerant combination, heat at around 215° F. is quite satisfactory.

Therefore, hot water from the tank 150 flows through a valve V4 to the second generator G2. The valve V4 delivers a variable amount of hot water from the tank 150 to the generator G2, as needed. Water for heating purposes is delivered through the line 155.

One of the significant advantages of the system shown in FIG. 3, even if only a single-stage chiller is used, is that the temperature of the heat transfer liquid returned to the heat exchanger 46 is very significantly reduced by the insertion of the water heaters downstream from the generator G1, thus further increasing the temperature drop across the heat exchanger 46, and reducing its cost and turbine exhaust pressure loss, thus increasing the heat and power extracted from the turbine exhaust.

ALTERNATIVE ABSORPTION CHILLERS

Figure 5:
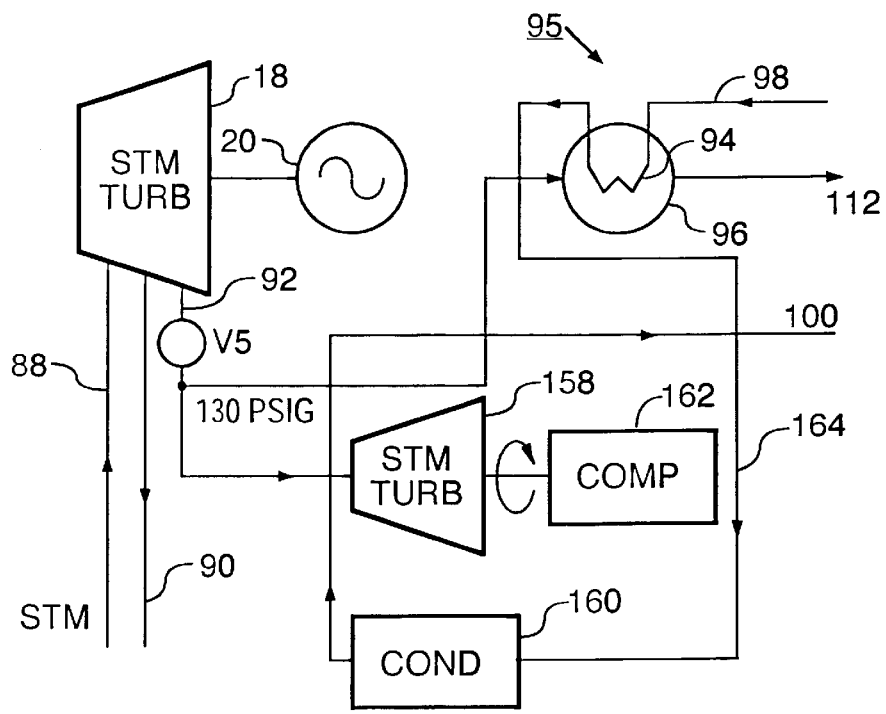
FIG. 5 is a schematic diagram of a portion of an additional embodiment of the system shown in FIG. 1.

FIG. 5 is a diagram showing an alternative system using an absorption chiller which uses mechanical compression as well as heat in enhanced absorption refrigeration. Such chillers are known as "VRA" chillers, as shown in my U.S. Pat. No. 5,816,070, or "ACHP" chillers, as shown in my U.S. Pat. Nos. 5,600,967 and 6,050,083. The disclosure of those patents hereby is incorporated herein by reference.

In this embodiment of the invention, steam is delivered through a turbine extraction outlet to conduit 92 from a condensing type turbine 18 to a second steam turbine 158 designed to operate using exhaust steam having a lower pressure that that input to the turbine 18. The shaft of the second turbine 158 drives a mechanical compressor 162 whose output is used to assist in the enhanced absorption refrigeration system operation. A separate condenser 160 is provided for the steam turbine 158, and cooling water is supplied through the line 164 to the condenser 160 as well as the condenser (not shown) of the turbine 18. The absorption generators of the two-stage chiller 95 are supplied with steam from the same line 92 as the second turbine 158, at about 130 p.s.i.g. (for a chiller using a lithium bromide-water refrigerant).

It should be understood that the absorption chillers 95 shown in FIGS. 1 and 5 can be used in combination with either the single-stage chiller 22 or the two-stage chiller 147 and single-stage chiller 148 supplied with heat from the heat transfer fluid, or alone, if desired. Alternatively, those chillers 95 can be disabled by use of the valve V5, leaving the chiller 22 or 147 and 148 to supply all of the refrigeration, thus providing maximum electrical power generation.

CONTROL CIRCUITRY

Figure 4:
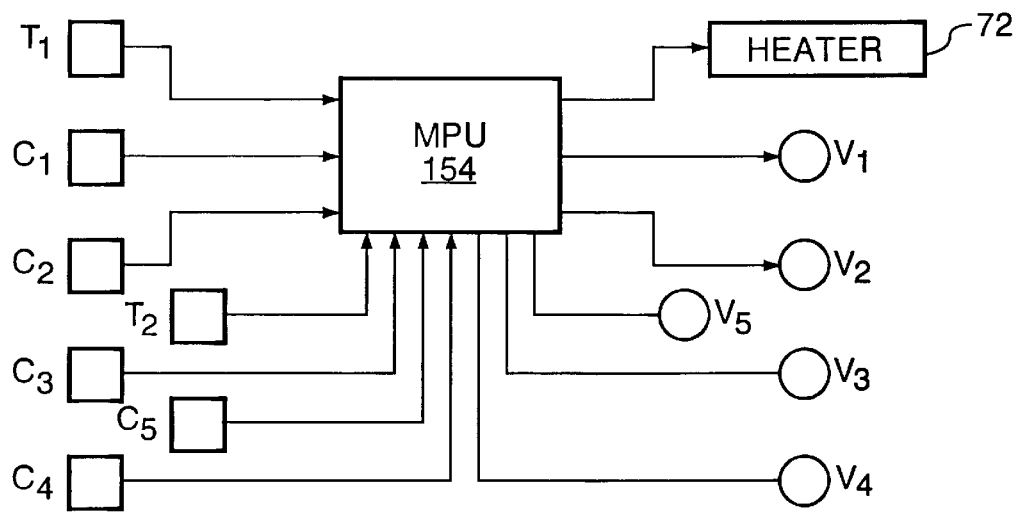
FIG. 4 is a schematic circuit diagram of a control circuit for a portion of the system shown in FIG. 1.

FIG. 4 is a schematic diagram showing the control system for the invention. A microprocessor 154 is connected to receive input signals from temperature sensors Ti and T2, as well as controllers C1, C2, C3 and C4. The microprocessor is programmed to provide the following functions in response to the input signals described above.

The heater 72 is used to heat the high temperature heat transfer liquid if, and only if, the temperature of the liquid is not high enough. Therefore, the heater 72 is turned on only as long as the temperature T1 is below a predetermined minimum temperature needed for operating the absorption chiller(s) and water heaters shown in FIG. 3. The heater 72 might be used, for example, when the turbine is shut down, or the exhaust gases are diverted away from the heat exchangers to reduce steam generation, or in other circumstances.

The valve V1 is operated in response to control signals supplied by controller C1 which is responsive to the demand for refrigeration to divert heat transfer fluid through the by-pass 27 to reduce the refrigeration output of the chiller when there is reduced or no demand for refrigeration. Note that the heat transfer fluid still passes through heating coils 151 and 153 to heat the water in the tanks 150 and 152. Of course, a diverter valve also can be provided for each of those water tanks, if needed.

Diverter valve V2 operates in response to controller C2 to divert heat transfer liquid around the heat exchanger 46 in order to reduce the temperature of the heat transfer liquid, when it is desired to do so due to reduced demand for steam, or for other purposes.

Valve V2 also operates in response to temperature sensor T2 to assure that the temperature of the liquid remains within a desired range.

The valve V3, which is operated to divert exhaust gas to atmosphere when its heat is not needed, is operated by the controller C3 which responds to the demand for steam, refrigeration and hot water.

Valve V4 operates in response to controller C4 which determines when the generator G2 of absorption chiller 148, shown in FIG. 3, needs more or less hot water.

Valve V5 operates in response to the output from controller C5 which determines the amount of electric power generation needed relative to the amount of refrigeration needed.

It will be apparent from the foregoing that the objectives of the invention are well met by the systems and methods described above. Efficiency is enhanced by the greater utilization of waste heat, and equipment size and costs are significantly reduced. The cogeneration system is versatile in that it can supply varying amounts of electrical energy, refrigeration and heating, in response to varying needs.

The above description of the invention is intended to be illustrative and not. limiting. Various changes or modifications in the embodiments described may occur to those skilled in the art. These can be made without departing from the spirit or scope of the invention.

What is claimed is:

1. A cogeneration system comprising;
   a fuel-burning turbine having a first output drive shaft and producing heated exhaust gases;
   a first working machine coupled to said output drive shaft for producing electrical energy;
   a hot-liquid heat-exchanger using a high-temperature-resistant liquid heat transfer fluid to absorb heat from said exhaust gases produced by said fueled turbine,
   a heat utilization device connected to receive heated heat transfer fluid from said heat-exchanger and extract heat from said fluid,
   a closed-circuit conduit for conveying said heat transfer fluid from said heat-exchanger, past said heat utilization device and back to said heat-exchanger,
   means in said closed circuit for flowing said heat transfer fluid through said closed-circuit conduit, and
   an absorption chiller having a generator section in heat-transfer connection with said conduit at a location downstream from said heat utilization device to utilize heat from said heat transfer fluid to produce cooling.

2. A system as in claim 1 in which said heat utilization device is selected from the group consisting of a steam generator, a hot water generator, and a combination steam and hot water generator, and said liquid heat transfer fluid is an organic liquid.

3. A system as in claim 2 including
   a steam turbine connected to receive steam from said steam generator and develop shaft power, and
   a second working machine driveably connected to receive said shaft power and generate an output selected from the group consisting of electrical power and refrigeration.

4. A system as in claim 1 including at least one hot water heater connected in said conduit downstream from said heat exchanger, said hot water heater being connected to use heat from said transfer fluid to generate hot water.

5. A system as in claim 4, including a second hot water heater connected in said conduit downstream from the first-named water heater, said first-named water heater being adapted to heat water to a relative high temperature, and said second water heater being adapted to heat water to a temperature lower than said relatively high temperature.

6. A system as in claim 4 in which said absorption chiller is a two-stage chiller, and including a second absorption chiller having a second generator section, the first-named generator section being connected to receive said heat transfer fluid from said heat-utilization device, and said second generator section being connected to receive hot water from said hot water heater.

7. A system as in claim 1 including a selectively operable heater upstream from said absorption chiller for heating said heat transfer fluid, and control means for sensing the temperature of said heat transfer fluid and operating said heater whenever said temperature falls below a pre-determined level.

8. A system as in claim 1 including a valve in said conduit for bypassing a variable portion of the flow of said heat transfer fluid around said absorption chiller, and control means for controlling said valve to meter the amount of heat transfer fluid flowing through said chiller in accordance with system refrigeration needs.

9. A system as in claim 1 including a valve in said conduit for selectively bypassing heat transfer fluid around said heat-exchanger, and control means for operating said valve in response to system requirements.

10. A method of cogeneration, said method comprising the steps of:
   (a) developing shaft power by operating a fueled turbine emitting heated exhaust gases;
   (b) using said shaft power to generate an output selected from the group consisting of electrical energy and refrigeration;
   (c) using said heated exhaust gases by applying said gases to a heat exchanger containing a high-temperature-resistant heat transfer liquid,
   (d) flowing said heat transfer liquid through a closed circuit path in which said heat-exchanger is located, and
   (e) transferring heat from said heat transfer liquid downstream from said heat exchanger to the generator section of an absorption chiller.

11. A method as in claim 10 including the steps of:
   using the heat from said heat exchanger to generate steam,
   delivering steam to a steam turbine to develop further shaft power, and
   using said further shaft power from said steam turbine to generate an output selected from the group consisting of electrical energy and refrigeration.

12. A method as in claim 10 including the steps of:
   locating a temperature sensor and a heater in said path upstream from said absorption chiller, and operating said heater to heat said liquid when the temperature sensed by said sensor falls below a predetermined level.

13. A method as in claim 10 including the steps of:

locating at least one water heater in said closed circuit path downstream from said absorption chiller, and utilizing hot water from said heater for one of heating and/or hot water supply to a building.

14. A method as in claim 10 including the steps of:

locating a second water heater in said path downstream from the first-named water heater, said second water heater being adapted to heat water to a lower temperature than water heated by said first-named water heater.

15. A method as in claim 10 including the steps of:

locating a valve selectively operable for bypassing said liquid around said absorption chiller, and controlling said valve to vary the amount of said liquid reaching said chiller in response to system refrigeration requirements.

16. A method as in claim 10 in which said absorption chiller is a two-stage device having at least one generator section, directing said heat transfer fluid through said generator section, providing a single-stage absorption chiller with a second generator section, and directing hot water from one of said water heaters to heat said second generator section.

17. A method as in claim 10 including the steps of:

providing a valve for selectively diverting heat transfer liquid around said heat exchanger, sensing the temperature of said liquid proximate said heat exchanger, and controlling said valve in response to said temperature and in accordance with system needs for heat output from said heat exchanger.

18. A method as in claim 11 including the steps of:

selectively connecting an absorption chiller to receive exhaust steam from said steam turbine to supply heat to said absorption chiller to develop refrigeration when such refrigeration is needed, and using said turbine exclusively to generate electrical power when such refrigeration is not needed.

19. A cogeneration system comprising:

a fuel-burning turbine having a first output drive shaft and producing heated exhaust gases;

a first working machine coupled to said output drive shaft for producing electrical energy;

a steam generator positioned to receive said heated exhaust gases from said fuel-burning turbine and to develop steam using heat from said gases;

a steam turbine connected to receive steam from said steam generator, use said steam to develop power on a second output drive shaft, and provide exhaust steam;

a second working machine coupled to said second output drive shaft for generating electrical energy and/or refrigeration;

an absorption chiller connected to use exhaust steam from said steam turbine as a heat source for absorption cooling;

said steam generator including a hot-liquid heat-exchanger using a high-temperature-resistant liquid heat transfer fluid to absorb heat from said exhaust gases produced by said fueled turbine, a steam-generating heat exchanger connected to said hot-liquid heat exchanger to transfer heat from said transfer fluid to water to convert said water into steam, and a pump for flowing said transfer fluid through said hot-liquid heat-exchanger and said steam-generating heat exchanger.

20. A cogeneration system as in claim 19 including a conduit for conducting relatively low-pressure steam from said steam turbine to said fueled turbine for injection into said fueled turbine.

21. A cogeneration system as in claim 19 in which said second working machine is an electrical generator, and including means for selectively reducing the amount of steam delivered to said absorption chiller to increase electrical power output from said electrical generator.

22. A cogeneration system as in claim 19 in which said steam turbine is a back-pressure type of turbine and said absorption chiller is a single-stage indirectly-heated absorption chiller with a condenser and a return conduit for returning water from said condenser to said steam generator.

23. A cogeneration system as in claim 20 in which said system includes a water deaerator, and said conduit is connected to convey steam to said deaerator for use in deaerating water to be delivered to said steam generator.

24. A cogeneration system as in claim 19 including a second steam turbine connected to receive exhaust steam from the first-named steam turbine and convert it into shaft power, and an absorption chiller selected from the group consisting of an ACHP and a VRA absorption chiller, said chiller having a compressor driven by said second steam turbine and connected to use exhaust steam from said steam turbine as a heat source for absorption cooling.

25. A cogeneration method comprising the steps of:

(a) developing shaft power by operating a fueled turbine emitting heated exhaust gases;

(b) using said shaft power to generate an output selected from the group, consisting of electrical energy or refrigeration;

(c) using said heated exhaust gases to generate steam by applying said gases to a heat exchanger containing a high-temperature-resistant heat transfer liquid;

(d) flowing said heat transfer liquid through a steam generator to generate steam and in heat-transfer relationship with the generator of an absorptive chiller;

(e) delivering steam from said steam generator to a steam turbine to develop output power on an output shaft, and (f) using the output power on said output shaft of said steam turbine to generate electric energy or refrigeration.

26. A method as in claim 25 including feeding relatively low pressure steam from said steam turbine into said fueled turbine at at least one location adjacent the burner of said turbine.

* * * * *